US008234147B2

(12) United States Patent
Olejniczak et al.

(10) Patent No.: US 8,234,147 B2
(45) Date of Patent: Jul. 31, 2012

(54) MULTI-VARIABLE PRODUCT RANK

(75) Inventors: Nicholas Jon Olejniczak, Madison, WI (US); Mohammed Moinuddin, Madison, WI (US); Joshua John Puetz, Fitchburg, WI (US); Keith McClelland Burke, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 12/466,560

(22) Filed: May 15, 2009

(65) Prior Publication Data
US 2010/0293034 A1 Nov. 18, 2010

(51) Int. Cl.
G06Q 10/00 (2006.01)

(52) U.S. Cl. ............ 705/7.29; 705/7.11; 705/26.1

(58) Field of Classification Search ........... 705/7.11, 705/7.29–7.35, 40
See application file for complete search history.

(56) References Cited

U.S. PATENT DOCUMENTS

| | | | | |
|---|---|---|---|---|
| 5,794,220 | A * | 8/1998 | Hunt | 705/40 |
| 6,986,100 | B1 * | 1/2006 | Roper et al. | 715/206 |
| 7,082,426 | B2 * | 7/2006 | Musgrove et al. | 1/1 |
| 7,499,901 | B2 * | 3/2009 | Crosby et al. | 706/48 |
| 7,693,901 | B2 * | 4/2010 | Ka et al. | 707/723 |
| 7,809,601 | B2 * | 10/2010 | Shaya et al. | 705/7.31 |
| 2002/0004735 | A1 * | 1/2002 | Gross | 705/10 |
| 2002/0010620 | A1 * | 1/2002 | Kowalchuk et al. | 705/10 |
| 2002/0161664 | A1 * | 10/2002 | Shaya et al. | 705/26 |
| 2003/0135490 | A1 | 7/2003 | Barrett | |
| 2004/0143600 | A1 * | 7/2004 | Musgrove et al. | 707/104.1 |
| 2004/0267676 | A1 * | 12/2004 | Feng et al. | 705/400 |
| 2005/0065909 | A1 * | 3/2005 | Musgrove et al. | 707/2 |
| 2006/0218062 | A1 * | 9/2006 | Drew et al. | 705/35 |
| 2006/0242129 | A1 | 10/2006 | Libes | |
| 2007/0038608 | A1 * | 2/2007 | Chen | 707/3 |
| 2007/0038620 | A1 * | 2/2007 | Ka et al. | 707/5 |
| 2007/0043583 | A1 * | 2/2007 | Davulcu et al. | 705/1 |
| 2007/0100824 | A1 | 5/2007 | Richardson | |
| 2007/0100875 | A1 * | 5/2007 | Chi et al. | 707/102 |
| 2007/0136457 | A1 * | 6/2007 | Dai et al. | 709/224 |
| 2008/0120129 | A1 * | 5/2008 | Seubert et al. | 705/1 |
| 2008/0208719 | A1 * | 8/2008 | Sharma et al. | 705/29 |
| 2009/0006371 | A1 | 1/2009 | Denoue | |
| 2009/0029687 | A1 | 1/2009 | Ramer | |

FOREIGN PATENT DOCUMENTS

WO 2008061133 A1 5/2008

OTHER PUBLICATIONS

Chakrabarti, Deepayan et al., "Contextual Advertising by Combining Relevance with Click Feedback," http://www.cs.cmu.edu/~deepay/mywww/papers/www08-interaction.pdf, Apr. 21-25, 2008.

* cited by examiner

*Primary Examiner* — Lynda Jasmin
*Assistant Examiner* — Alan S Miller
(74) *Attorney, Agent, or Firm* — Shook, Hardy & Bacon L.L.P.

(57) ABSTRACT

Methods, systems, and computer-readable media for ranking products using multiple data sources are provided. A computerized ranking system includes a ranking engine, loaders, and a presentation component. The ranking engine calculates a score for each product based on multiple counts logged by data sources. Loaders communicatively connected to the ranking engine provide the counts to the data sources. The presentation component generates a ranked product list for display on client devices in response to requests for a list of popular products.

19 Claims, 6 Drawing Sheets

MULTI-VARIABLE PRODUCT RANK

BACKGROUND

Conventionally, a web service provider may measure popularity of a product based on one dimension. The dimensions used to measure the popularity of a product may include views, clicks, or sales. For instance, a shopping site may determine popularity of a book based on the number of sales for the book. Other web services may measure popularity of the book using other dimensions. This may result in some confusion because different web services provide a different popularity measures for the book.

Moreover, the popularity measure provided by the conventional web services is incomplete because the popularity measure is based on one dimension. A popularity measure using only one dimension does not provide a complete summary of the interest surrounding the product. Because the conventional popularity measure provides an incomplete summary of product popularity, the conventional web services are unable to provide popularity comparison across multiple dimensions for multiple products to determine which products are the most popular across discrete time periods.

SUMMARY

Embodiments of the invention overcoming these and other problems in the art relate in one regard to a ranking system, computer-readable media, and computer-implemented method to rank products across multiple variables. The ranking system generates a rank for each product based on multiple variables. The rank is used to determine popularity for products in a product database. The ranking system generates a list of popular products based on the rank assigned to each product.

The ranking system is a server computer that executes, among other components, loader components, a product rank component, and a user interface component. The loader components retrieve counts for the variables that are measured to determine the product rank. The variables include, among other variables, revenue data, view data, click data, and search data. The product rank component analyzes the variables received from the loader component and generates a multi-variable rank for each product in a product database. The user interface component configures a list of products based on the multi-variable rank for display to a user of a client device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

DETAILED DESCRIPTION

Figure 1:
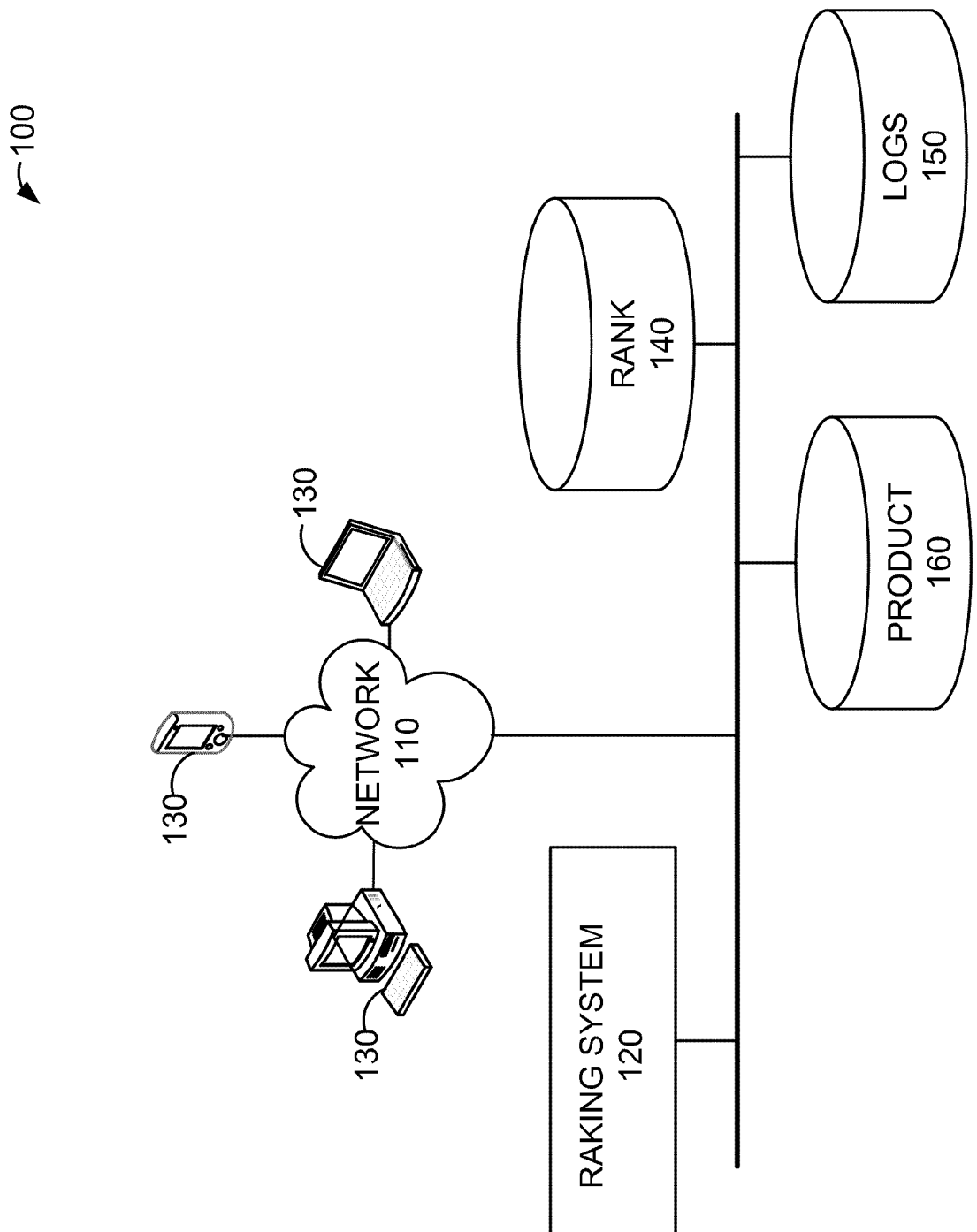
FIG. 1 is a network diagram that illustrates an exemplary computing system in accordance with embodiments of the invention.

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

As utilized herein, the term "component" refers to any combination of hardware, software, or firmware. As utilized here in the term "product" refers to goods or services provided by a vendor.

Embodiments of the invention provide a ranking system that generates a list of popular products based on a multivariable rank. The ranking system may combine all of the available revenue data, click data, search data, and view data for a product to generate a multivariable rank. The multivariable rank provides a complete summary of a product's popularity across a number of variables. Also, the multivariable rank allows the ranking system to compare popularity of products across discrete periods of time.

In one embodiment, a ranking system populates an analysis database with revenue data, search data, and other data provided by multiple data sources. For instance, a revenue data source may provide the ranking system with a count of the revenue generated for each product in a product database. The analysis database stores the various counts received from the multiple data sources. In turn, the ranking system retrieves the counts for each product, normalizes the counts, weights the counts, and generates a score for each products based on the normalized and weighted counts. The ranking system generates a list of products based on the score and formats the list for display to a user of a client device.

In some embodiments, a computer system that provides popularity for multiple products includes client devices, ranking systems, and product databases. The client devices may request to view popular products for all products or within a specific category of products. The ranking system receives the user request and generates a list of products having a multivariable rank. The ranking system provides the list of product based on the multivariable rank to the client devices. The multivariable rank is used to provide a summary of the product's popularity across multiple variables, including, but not limited to, sales, views, clicks, search, revenue, etc.

As one skilled in the art will appreciate, the computer system includes hardware, software, or a combination of hardware and software. The hardware includes processors and memories configured to execute instructions stored in the memories. In one embodiment, the memories include computer-readable media that store a computer-program product having computer-usable instructions for a computer-implemented method. Computer-readable media include both volatile and nonvolatile media, removable and nonremovable media, and media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-usable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, and other magnetic storage devices. These memory technologies can store data momentarily, temporarily, or permanently.

FIG. 1 is a network diagram that illustrates an exemplary computing system in accordance with embodiments of the invention. The computing system 100 includes a network 110, a ranking system 120, client devices 130, a rank database 140, log database 150, and product database 160.

The network 110 is configured to facilitate communication between the client devices 130 and the ranking system 120. The network 110 also facilitates communication between the ranking system 120, the rank database 140, the log database 150, and the product database 160. The network 110 may be a communication network, such as a wireless network, local area network, wired network, or the Internet. In an embodiment, the client devices 130 interact with the ranking system to receive a list of popular in a push or pull manner.

The ranking system 120 is a server that executes to generate a list of popular products from the products stored in the product database 160. The ranking system 120 also calculates and assigns a rank to each product. In one embodiment, the ranks are stored in a rank database 140 and are used to summarize popularity of a product across multiple variables. The ranking system 120 may push a list of popular products to a client device 130 that is registered to receive a realtime syndicate source (RSS) feed. Alternatively, the ranking system provides the list of popular products in response to a pull (e.g. query) from the client devices 130.

The client devices 130 connect to the ranking system 120 over the network 110. The client devices 130 receive a list of popular products from the ranking system 120 and displays the list to users of the client devices 130. In some embodiments, the list of popular products may be formatted in hypertext markup language (HTML) or extensible markup language (XML). The client devices 130 include, without limitation, personal digital assistants, smart phones, laptops, personal computers, gaming systems, set-top boxes, or any other suitable client computing device.

The rank database 140 stores ranks for products calculated by the ranking system 120. The rank database 140 stores, among other things, time period associated with a score, the score representing a popularity of a product calculated by the ranking system 120, and a product identifier for the product corresponding to the score. In an embodiment, the rank database 140 is a relational database or an object-oriented database. The rank database 140 receives a score for each product stored in the product database 160 from the ranking system 120. In one embodiment, the rank database 140 receives a score for each product hourly from the ranking system 120. In another embodiment, the ranking database 120 also includes a period record that stores an accumulated average score for a product over a six-hour period.

The log database 150 stores counts for the variables used by the ranking system 120. The variables include, among other variables, clicks, views, revenue, sales, and search. The log database 150 receives the counts for each variable from a number of data sources. The log database 150 associates each count with a product based on a product identifier associated with the count. The ranking system 120 access the log database 150 to generate a score that represents a rank for the popularity of each product based on the counts stored in the log database 150. In certain embodiments, the log database 150 is a relational database or an object-oriented database. In one embodiment, a data source having product views may also include number of clicks. Thus, the data source may provide a single electronic record that provides number of clicks per page view and number of page views of the product.

The product database 160 stores product data. The products in the product database 160 include goods or services provided by vendors. The products may include electronics, books, movies, insurance, etc. In an embodiment, the product database 160 is a relational database or an object-oriented database. For each product, the product database 170 stores, among other things, a product identifier, a category, a uniform resource locator (URL), and a description of the product. The ranking system 120 traverses the product database 160 to determine which products to rank. In some embodiments, the product identifier may be used by the ranking system 120 to identify the products in rank database 140 and the logs 150.

Accordingly, the computing system 100 is configured with a ranking system 120 that generates a popularity rank for each product in the product database. The ranking system 120 periodically generates the rank and provides a user with a graphical summary of the popularity of a group of products over a period of time. In turn, the client devices 130 may receive the list of popular products and a user may interact with the list of popular products to initiate a purchase transaction for a product on the list.

In some embodiments, a computerized ranking system calculates a multivariable rank based on counts received from multiple data sources. The computerized ranking system executes a ranking algorithm that generates a multivariable rank that represents a popularity of a product across discrete periods of time and multiple variables. The computerized ranking system is also configured to calculate the multivariable rank for products with a specific category or a user defined grouping.

Figure 2:
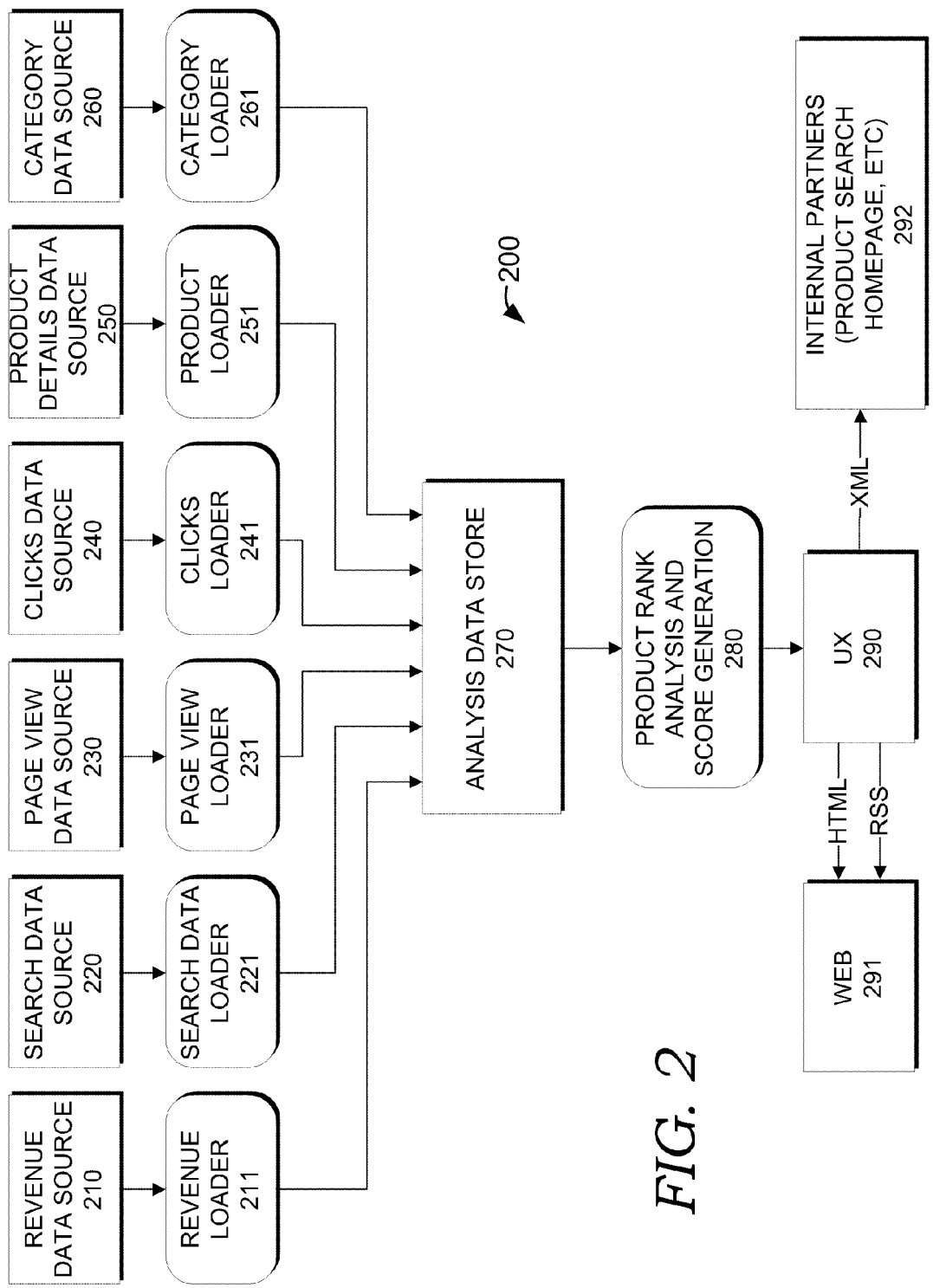
FIG. 2 is a component diagram that illustrates an exemplary computerized ranking system in accordance with embodiments of the invention.

FIG. 2 is a component diagram that illustrates an exemplary computerized ranking system 200 in accordance with embodiments of the invention. The computerized ranking system 200 includes a revenue data source 210, a search data source 220, a page view data source 230, a clicks data source 240, a product details data source 250, a category data source 260, an analysis data store 270, a product rank analysis and score generation component 280, and a user experience (UX) component 290.

The revenue data source 210 is a computer that logs transactions for products. The log stores the number of products purchased and a product identifier for each product. The revenue data source provides revenue earned by a vendor which may represent sales price less cost of the product to the vendor. Accordingly, in some embodiments, the log may store negative revenue or zero revenue for a product. The revenue data source 210 is accessed by revenue loader 211. The revenue loader 211 is a crawler that retrieves the log having revenue for each product. In turn, the revenue loader 211 stores and formats the revenues and product identifiers for each product in the analysis data store 270. In some embodiments, the log is provided by a third-party provider that accumulates revenue numbers for various products. In other embodiments, the revenue data source 210 stores both the sales data (e.g. actual sales price) and the revenue generated by the product in the log. Accordingly, the analysis data store 270 may receive both revenue and sales data for each product from the revenue loader 211.

The search data source 220 is computer that logs search request for products. The log stores the number of search requests for a certain product and may include a product identifier for each product included in the search log. The search data source 220 is accessed by a search data loader 221. The search data loader 221 is a crawler that retrieves the log having a number of search requests for each product. In turn, the search data loader 221 stores and formats the number of search requests and product identifiers for each product in the analysis data store 270.

The page view data source 230 is computer that logs page view requests for products. The log stores the number of page views for a certain product and may include a product identifier for each product included in the page view log. In one embodiment, the log stores the number of seconds a user dwells on a product page displayed on the computer. The page view data source 230 is accessed by a page view loader 231. The page view loader 231 is a crawler that retrieves the log having a number of page view requests for each product and the number of seconds a user dwells on each product page. In turn, the page view loader 221 stores and formats the number of page views and product identifiers for each product in the analysis data store 270.

The clicks data source 240 is computer that logs click request for products. The log stores the number of clicks for a certain product and may include a product identifier for each product included in the clicks log. The clicks data source 240 is accessed by a clicks loader 241. The clicks loader 241 is a crawler that retrieves the log having a number of click requests for each product. In turn, the clicks loader 241 stores and formats the number of click requests and product identifiers for each product in the analysis data store 270.

In one embodiment, the page view data source 230 and clicks data source 240 may be a single data source, where the number of page view requests is configured to include a number of clicks per page view for each product. Accordingly, a single crawler may access the single data source to retrieve a log having both the number of page views and number of clicks for each product for storage in the analysis data store 270.

The product details data source 250 is computer that stores information about each product. The product details data source 250 may store, price, description, quantity, availability, or other product data in compressed files. The product details data source 250 is accessed by a product loader 251. The product loader 251 is a crawler that retrieves the product information. In turn, the product loader 251 stores and formats the product data in the analysis data store 270.

The category data source 260 is computer that stores information about each product. The categories may include, televisions, cameras, games, movies, cars, or other category data associated with the products. The category data source 260 is accessed by a category loader 261. The category loader 261 is a crawler that retrieves the category information. In turn, the category loader 261 stores and formats the category data in the analysis data store 270.

In one embodiment, the product details data source 250 and category data source 260 may be a single data source, where the product details include a number of categories for each product. Accordingly, a single crawler may access the single data source to retrieve both the product details and categories for each product for storage in the analysis data store 270. In another embodiment, the revenue data source 210, the search data source 220, the page view data source 230, the clicks data source 240, the product details data source 250, and the category data source 260 may be combined into a single data source accessible by a single crawler that formats and stores the data in the analysis data store 270.

The analysis data store 270 is a database having multiple disks to store the data received from the revenue data source 210, the search data source 220, the page view data source 230, the clicks data source 240, the product details data source 250, and the category data source 260. In some embodiments, the analysis data store 270 periodically receives the data from loaders 211, 221, 231, 241, 251, and 261. The loaders 211, 221, 231, 241, 251, and 261 may provide the data hourly, daily, or weekly.

The product rank analysis and score generation component 280 accesses the analysis data store 270 to calculate a score that represents a multivariable rank that is used by the UX component 280 to generate a list of popular products. In some embodiments, the product rank analysis and score generation component 280 periodically executes a ranking algorithm to generate a score for each product for each hour in a 24-hour period and for a specified number of hours within the 24-hour period. The product rank analysis and score generation component 280 accesses the analysis data store 270 to retrieve counts for each variable, including, but not limited to, page views, clicks, and sales or revenue data for a specific product and a specific time period. In turn, the product rank analysis and score generation component 280 provides an overall score for each product. That score represents the product's popularity for the given time period. When the product rank analysis and score generation component 280 orders the score for each product in the analysis data store 270 for the same time period a product rank is generated. The score for each product is calculated by evaluating $P\alpha+C\beta+R\gamma$; where P is the number of page views for a specific product, $\alpha$ is the weighting factor for P, C is the number of clicks for the product, $\beta$ is the weighting factor for C, R is the amount of revenue for the product, and $\gamma$ is the weighting factor for R. P, C, and R are normalized to a max of 1 such that if P=C=R then P+C+R=3. The normalization allows all three variables of the algorithm, each of which is independent and could be orders of magnitude different from one another, to be compared on an equal scale. Accordingly, the score range generated by the algorithm may be 0 to $(\alpha+\beta+\gamma)$. This range remains constant over any time period, which means the generated scores will remain comparable to one another over time yielding results that are comparable regardless of time period.

The UX component 290 receives the scores from the product rank analysis and score generation component 280 and formats the scores in an ordered list based on decreasing product scores. The UX component 290 may format the list as HTML, XML, or RSS. The HTML format of the list allows a user to receive the list in response to a request for the current list of popular items. The XML format of the list allows the UX component 290 to periodically provide the top three products to a dynamic section of web site that is dedicated to showing three products having the largest scores. The RSS format of the list allows the UX component 290 to periodically update a feed that is accessed by a user to determine, among other things, the popular products in a product database without requiring the user to repeatedly request the list from the UX component 290.

Accordingly, the computerized ranking system 200 transmits an ordered list of popular products for display to a user. The ranking system 200 periodically generates scores for the products that are comparable across time periods. In turn, a user that receives the list may request additional data for each product included in the list.

In some embodiments, the multivariable score is generated by a ranking system to determine a popularity of a product during a specified period of time. A normalized score may also be used to determine a popularity of a product within a specific product category or among a group of user defined product. The ranking system uses normalized scores to determine popularity within a subset of products.

Figure 3:
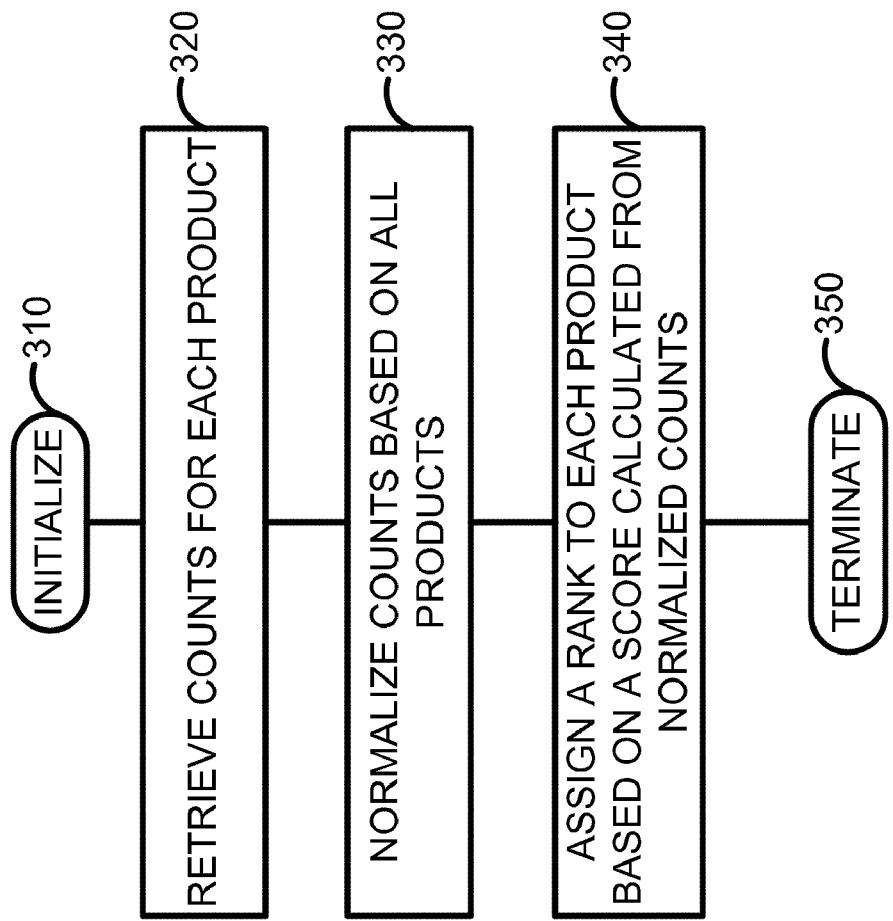
FIG. 3 is a logic diagram that illustrates an exemplary method to rank products in accordance with embodiments of the invention.

FIG. 3 is a logic diagram that illustrates an exemplary method to rank products in accordance with embodiments of the invention. The method initializes in step 310. In step 320, the ranking system retrieves counts associated with each product from disparate data sources. In turn, the ranking system normalizes the counts for each product based on all products included in a product database, in step 330. The ranking system assigns an ordered rank to each product based on a score calculated from the normalized counts, in step 340. In one embodiment, a list is generated for display, where the list includes products based on the assigned rank. The list may be formatted as one of a HTML list, a XML list, or a RSS list. The method ends in step 350.

In another embodiment, the ranking system may generate a multivariable score based on page views, clicks, purchases, and search appearances to determine a product's relative popularity within a collection of products. The score may be normalized to allow all products to be compared on an equivalent scale and across different time periods. The scores are used by the ranking system to provide a ranked list of products to a user.

Figure 4:
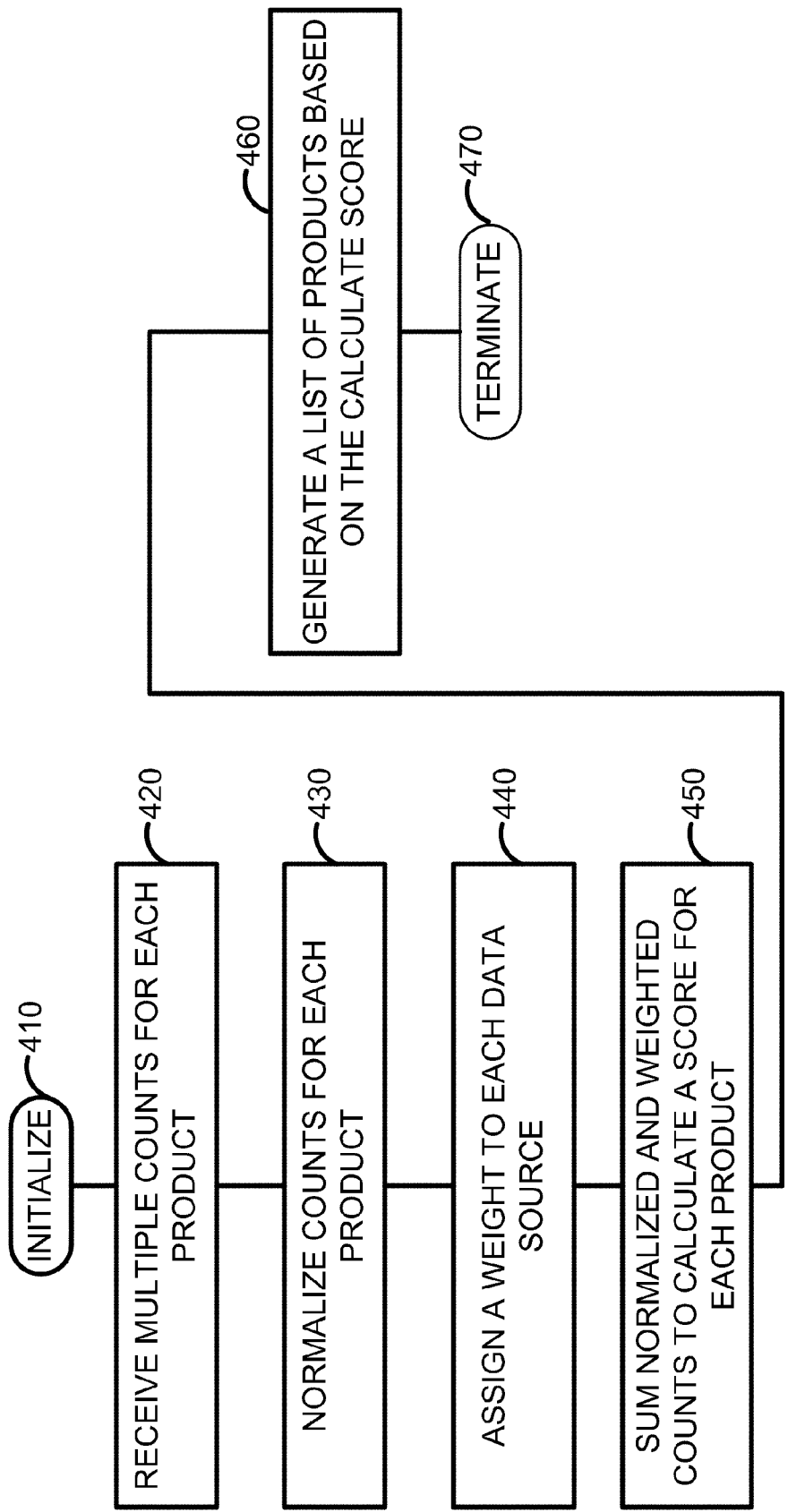
FIG. 4 is a logic diagram that illustrates an exemplary method to generate a list of ranked products in accordance with embodiments of the invention.

FIG. 4 is a logic diagram that illustrates an exemplary method to generate a list of ranked products in accordance with embodiments of the invention. The method initializes in step 410. In step 420, the ranking system receives multiple counts for products from a plurality of data sources. The counts are periodically received by the ranking system from the data sources. In step 430, the ranking system normalizes the counts for each product within each data source. A product's score across discrete ranges of time are comparable based on the normalizations applied to counts. For instance, normalized page views counts ($V_i$) for a product (p) over time period i may be evaluated from $V_i = p_i/P_{max_i}$. The normalized page views counts $V_i$ for product z are comparable to normalized page views counts $V_i$ for product y due to the normalization applied to the counts The normalized counts range from 0 to 1. A weight is assigned to each data source by the ranking system, in step 440. The ranking system uses the weight to calculate a score for each product. In step 450, the ranking system sums the normalized and weighted counts to calculate a score for each product. The score may be evaluated using the following: Score=$\alpha V + \beta C + \delta R + \zeta S$, where V is a normalized number for page view for each product, C is a normalized number of clicks, R is a normalized revenue, S is a number of appearances in search results, $\alpha$ is a weighting factor for V, $\beta$ is a weighting factor for C, $\delta$ is a weighting factor for R, and $\zeta$ is a weighting factor for S. In turn, the ranking system generates a ranked list based on the calculated score for each product in step 460. The list may include categories and the ranks for products in each category are normalized by the ranking system. The method ends in step 470.

In an embodiment, the list of popular products may include several categories. The ranking system generates the ranked list of products within predetermined product categories. Once scored, the products will be placed in descending order from highest score to lowest. A threshold may be used to isolate the most popular products at a particular point in time.

Figure 5:
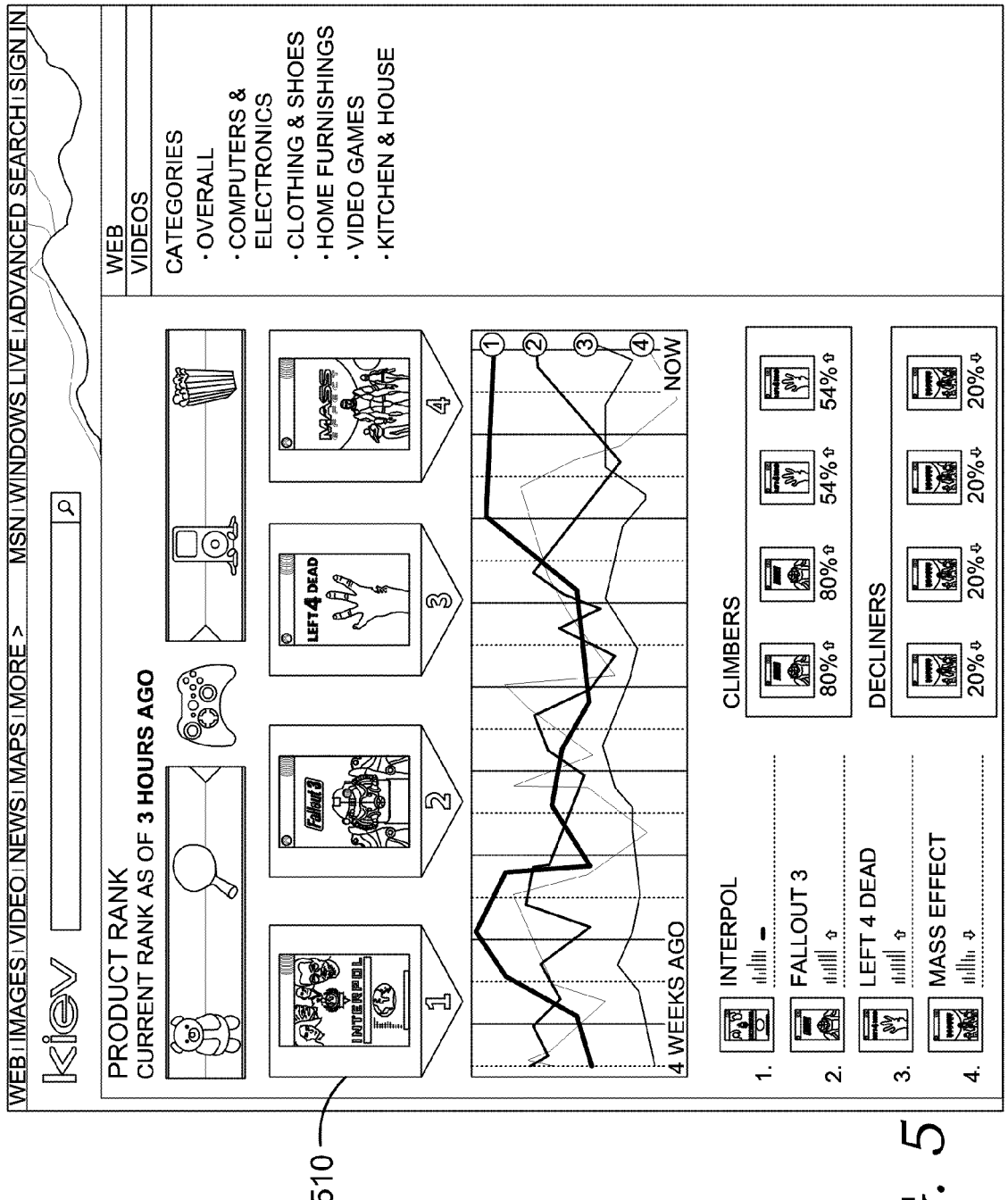
FIG. 5 is a user interface diagram that illustrates a ranked list of products based on popularity over a discrete period of time in accordance with embodiments of the invention.

FIG. 5 is a user interface diagram that illustrates a ranked list of products 510 based on popularity over a discrete period of time in accordance with embodiments of the invention.

The ranked list of products 510 generated by the ranking system may display the rank for the product over a specific period of time. For instance, the popular videos over a three hour time period may be included in the list. The ranked list of products 510 may also illustrate the trajectory of a product based on the changes in the product's score over a period time. Accordingly, the ranked list of products 510 may classify some products as climbers because of a positive change in the score and other products as decliners because of a negative change in score.

In an embodiment, the ranked list of products may include a comparison chart that provides a visual graph of the differences between scores of the top four products as trend lines over a previous number of time periods. The trend lines illustrate the variability of a product's score over a certain number of time periods on a scale relative to the product itself.

Figure 6:
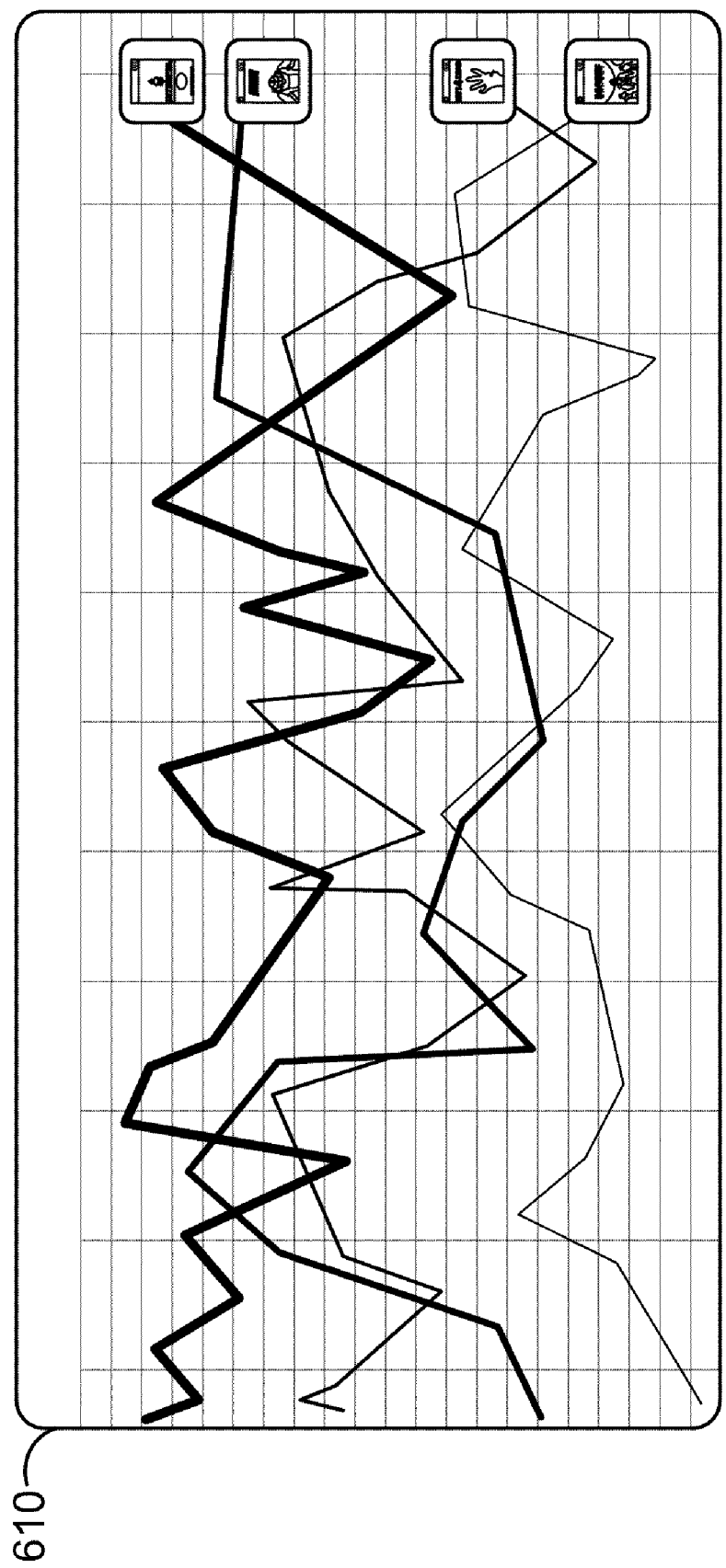
FIG. 6 is a user interface diagram that illustrates a comparison graph that compares ranked products over a discrete period of time in accordance with embodiments of the invention.

FIG. 6 is a user interface diagram that illustrates a comparison graph 610 that compares ranked products over a discrete period of time in accordance with embodiments of the invention.

The comparison graph 610 may illustrate the change in scores for products within a video game category selected by a user. For instance, the video game category may include the top four games. The comparison graph 610 illustrates the games that are gaining popularity and the games that are losing popularity in a graphical manner. The comparison graph also illustrates that rate at which popularity changes over a specified period of time.

In summary, the ranking system allows a user to receive a ranked list of products and to compare popularity of products in the ranked list. The ranking system employs a multivariable score to generate a rank for each product in a product database. The ranking system generates normalized rank for products within specific categories or within a subset of products selected by the user.

The foregoing descriptions of the embodiments of the invention are illustrative, and modifications in configuration and implementation are within the scope of the current description. For instance, while the embodiments of the invention are generally described with relation to FIGS. 1-6, those descriptions are exemplary. Although the subject matter has been described in language specific to structural features or methodological acts, it is understood that the subject matter defined in the appended claims is not necessarily limited to the specific features or acts described above. Rather, the specific features and acts described above are disclosed as example forms of implementing the claims. The scope of the embodiment of the invention is accordingly intended to be limited only by the following claims.

We claim:

1. One or more computer-readable media storing computer-usable instructions that cause one or more processors to perform a method that ranks products, the method comprising:

retrieving counts associated with each product from disparate data sources;

normalizing counts based on all products included in the database; and assigning a rank to each product based on a score calculated from the normalized counts, wherein the score is calculated by summing the normalized counts in accordance with the following: Score=$\alpha P+\beta C+\delta R+\zeta S$, where P is a normalized number for page view for each product, C is a normalized number of clicks, R is a normalized revenue, S is a number of appearances in search results, $\alpha$ is a weighting factor for P, $\beta$ is a weighting factor for C, $\delta$ is a weighting factor for R, and $\zeta$ is a weighting factor for S.

2. The media of claim 1, further comprising: generating for display a list of products based on the assigned rank.

3. The media of claim 2, further comprising: formatting the list of products as one of a HTML list, a XML list, or a RSS list.

4. A computer-implemented method to rank products, the method comprising:

receiving multiple counts for products from a plurality of data sources;

normalizing, by a processor of a computer, the counts for each product within each data source;

assigning, by a processor of a computer, a weight to each data source, wherein weight is used to calculate the score;

summing, by a processor of a computer, the normalized and weighted counts to calculate a score for each product, wherein the score is calculated using the following: Score=$\alpha P+\beta C+\delta R+\zeta S$, where P is a normalized number for page view for each product, C is a normalized number of clicks, R is a normalized revenue, S is a number of appearances in search results, $\alpha$ is a weighting factor for P, $\beta$ is a weighting factor for C, $\delta$ is a weighting factor for R, and $\zeta$ is a weighting factor for S; and generating, by a processor of a computer, a list based on the calculated score for each product.

5. The method of claim 4, wherein the counts are periodically received from the data sources.

6. The method of claim 4, wherein the product's rank across discrete ranges of time is comparable based on the normalizations applied to counts.

7. The method of claim 4, wherein the normalized counts range from 0 to 1.

8. The method of claim 4, wherein the list includes categories and the ranks for products in each category are normalized.

9. A computerized ranking system, the ranking system comprising:

a computer processor coupled to a memory, wherein the computer processor is programmed to execute:

a ranking engine to calculate a score for each product stored in product databases, wherein the score is based on multiple counts logged by a plurality of data sources and is derived by summing normalized multiple counts in accordance with the following: Score=$\alpha P+\beta C+\delta R+\zeta S$, where P is a normalized number for page view for each product, C is a normalized number of clicks, R is a normalized revenue, S is a number of appearances in search results, $\alpha$ is a weighting factor for P, $\beta$ is a weighting factor for C, $\delta$ is a weighting factor for R, and $\zeta$ is a weighting factor for S;

a plurality of loaders communicatively connected to the ranking engine, the loaders receive the counts for each product from the plurality of data sources; and a presentation component to format a list of products, based on the scores calculated by the ranking engine, for display on client devices in response to requests for a list of popular products, wherein the display includes a graphical summary of score differences for the list of products over a period of time.

10. The computerized ranking system of claim 9, wherein the score is based on normalized counts logged by the plurality of data sources.

11. The computerized ranking system of claim 9, wherein the counts include number of page views, number of clicks, amount of revenue, number of entries in a search log.

12. The computerized ranking system of claim 9, wherein the counts include offline store transaction data.

13. The computerized ranking system of claim 9, wherein the counts include number of sales generates, number of seconds a user dwells on a product displayed on the computer.

14. The computerized ranking system of claim 9, wherein the loader is a device that accesses a data source to obtain the counts.

15. The computerized ranking system of claim 9, wherein the data sources are relational databases that store counts.

16. The computerized ranking system of claim 9, wherein the loaders periodically retrieves the counts from the multiple data source.

17. The computerized ranking system of claim 9, wherein each data source is associated with a specific loader.

18. The computerized ranking system of claim 9, wherein the ranking engine normalizes the scores based on categories selected by a user of client device to rank products based on score within the selected category.

19. The computerized ranking system of claim 9, wherein the presentation component is configured to output a ranked list in one of HTML format, RSS format, or XML format.

* * * * *